United States Patent [19]

Jegers et al.

[11] Patent Number: 4,496,822
[45] Date of Patent: Jan. 29, 1985

[54] TILTING RELEASING LATCH STRUCTURE FOR WELDING MACHINE WELDING HEAD

[75] Inventors: Viktor J. Jegers, Bloomington; Duncan T. Lasley, Minneapolis, both of Minn.

[73] Assignee: Century Mfg. Co., Minneapolis, Minn.

[21] Appl. No.: 512,484

[22] Filed: Jul. 11, 1983

[51] Int. Cl.³ .............................................. B23K 37/02
[52] U.S. Cl. .................................. 219/125.1; 219/136
[58] Field of Search .................. 219/125.1, 124.1, 126, 219/136; 901/41, 42

[56] References Cited

U.S. PATENT DOCUMENTS

| 3,931,489 | 1/1976 | Roderburg et al. | 219/125.1 |
| 4,312,622 | 1/1982 | Favareto | 901/42 X |

FOREIGN PATENT DOCUMENTS 2738692  3/1979  Fed. Rep. of Germany ... 219/125.1

Primary Examiner—Roy N. Envall, Jr.
Assistant Examiner—C. M. Sigda
Attorney, Agent, or Firm—Leo Gregory

[57] ABSTRACT

An electric arc welding machine with a tiltable demountable welding head embodying a snap lock hinge structure providing for a tilted positioning of the welding head or for the ready removal of the tilting head for welding purposes remote from the base supporting structure.

3 Claims, 6 Drawing Figures

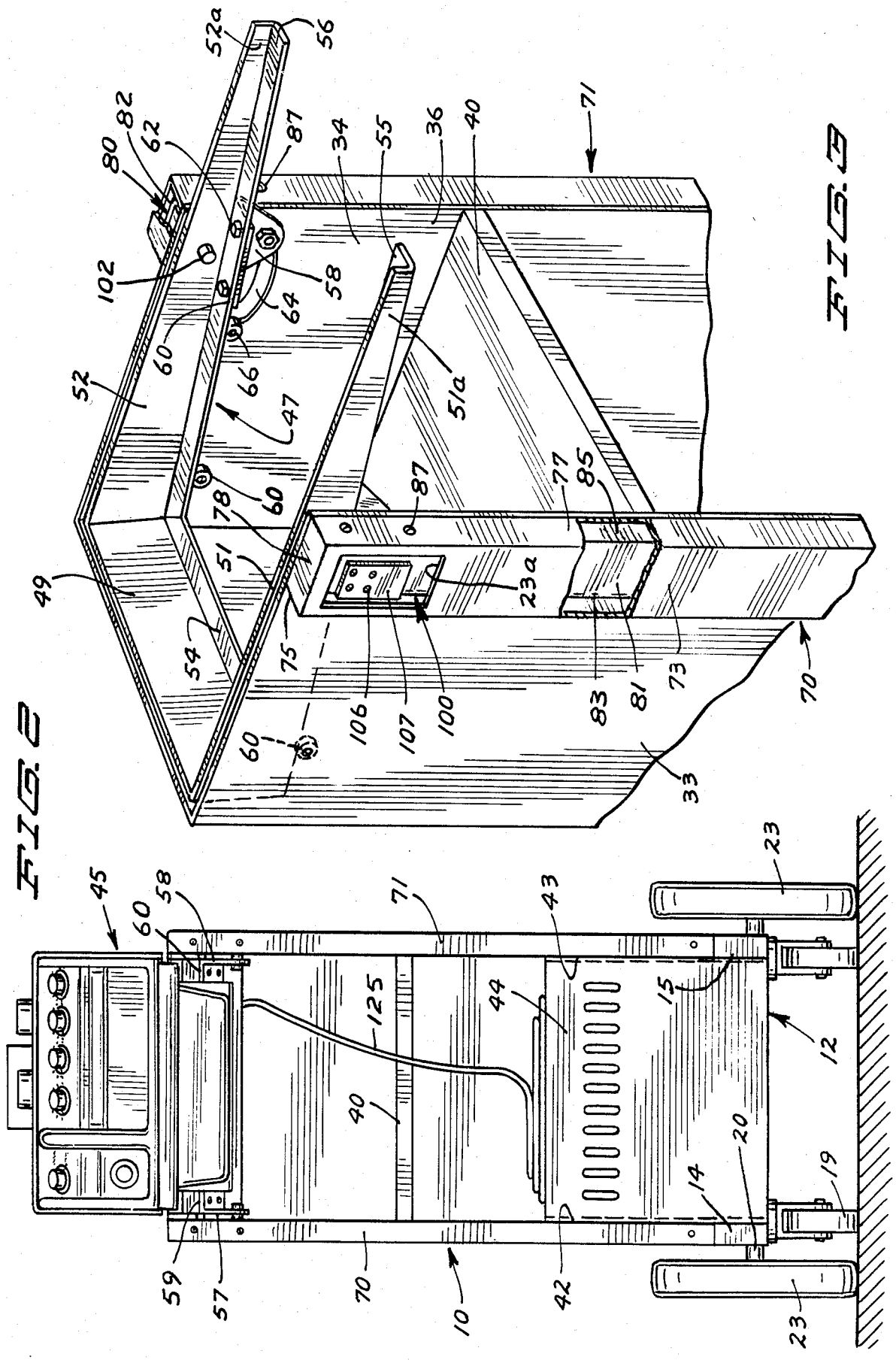

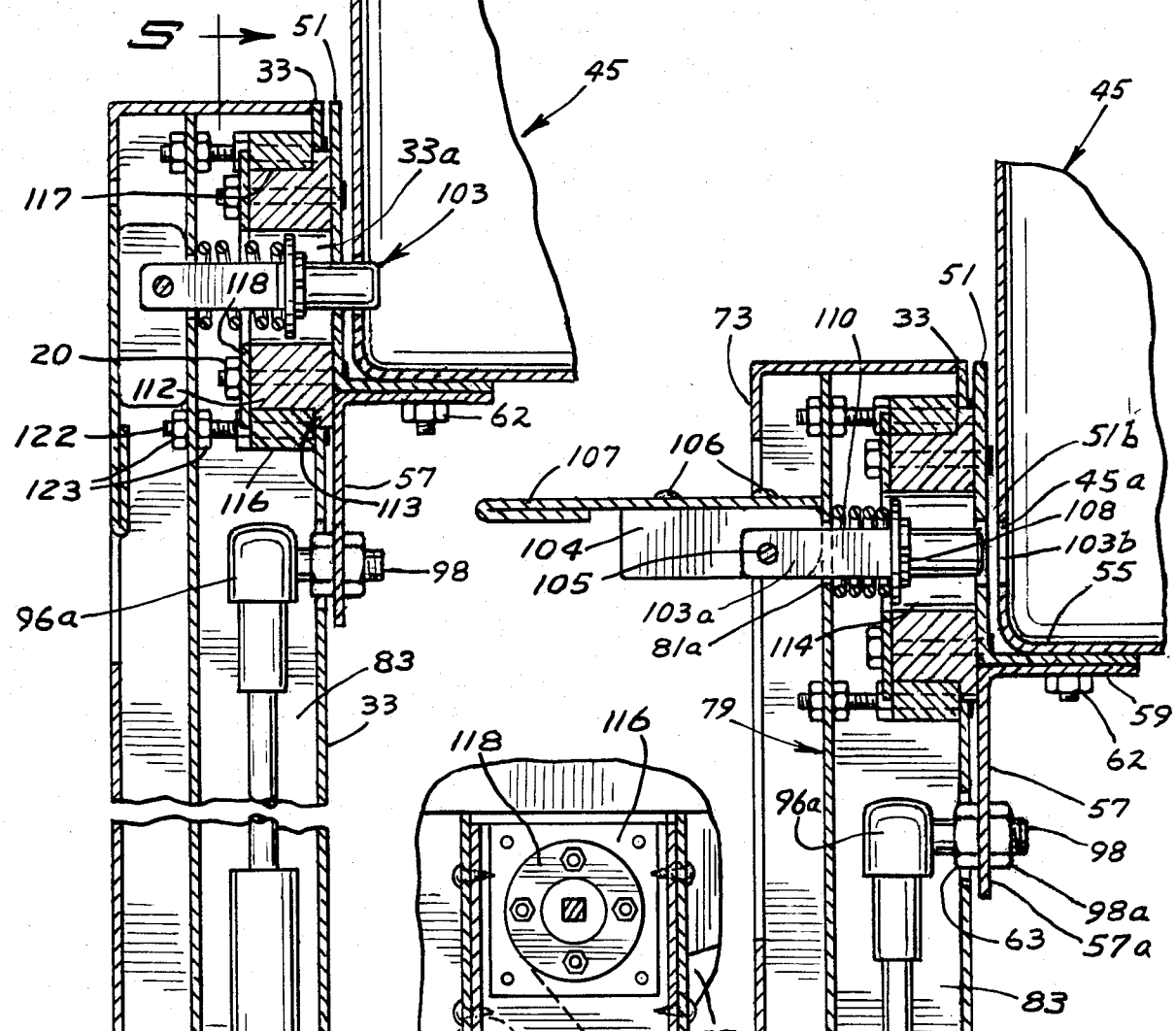
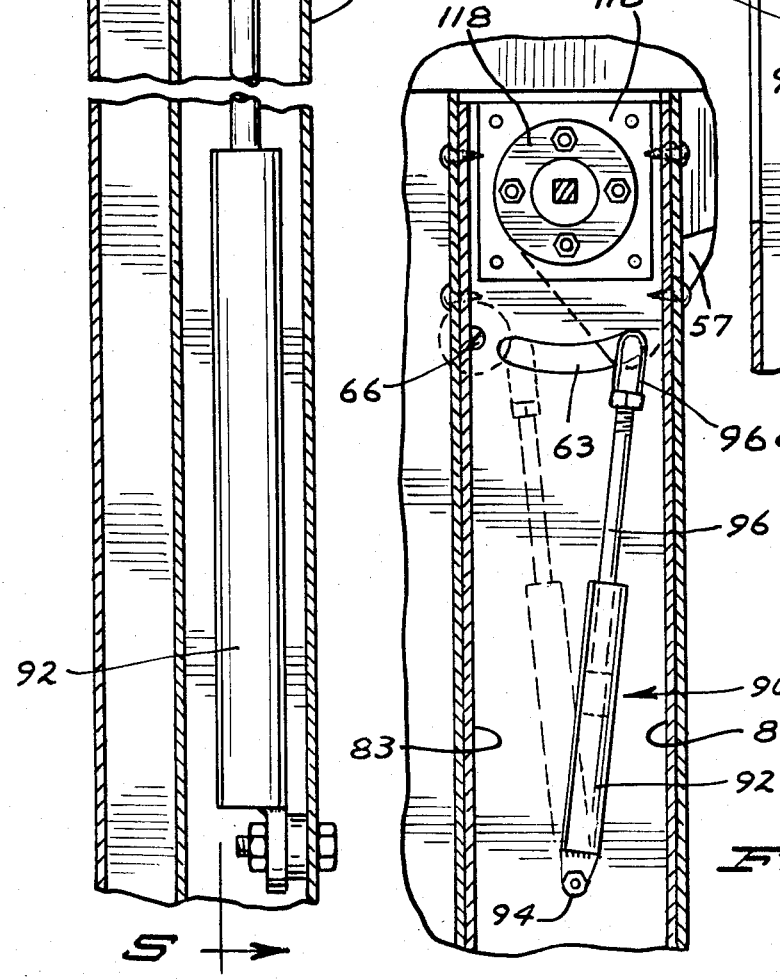

TILTING RELEASING LATCH STRUCTURE FOR WELDING MACHINE WELDING HEAD

BACKGROUND OF THE INVENTION

1. Field of Invention.

This invention relates to a latch structure permitting the ready tilting or removal of the welding head of a welding machine.

2. Description of the Prior Art.

Electric arc welding machines are known in the art to have demountable welding heads and are known to require the use of tools to demount the welding head for welding purposes remote from its supporting base structure.

SUMMARY OF THE INVENTION

This invention relates particularly to a snap lock latch structure which secures a welding head to a base supporting structure and is particularly adapted to permit the ready tilting of the welding head to a convenient working angle or to permit the ready demounting or removal of the welding head from the supporting base structure.

More specifically it is an object of this invention to provide a snap type of a latch structure for the welding head of an electric welding machine wherein by pulling a pair of plate members, the welding head is disconnected from being secured to its supporting or base structure.

It is another object of this invention to provide a latch hinge structure in connection with the welding head of an electric welding machine wherein the latch member embodies a pair of locking pins which are readily withdrawn from the welding head for its removal. In the alternative, the latch structure provides with a lever arrangement for the ready tilting of the welding head.

More particularly, it is an object of this invention to provide a latch structure embodying the use of hinge pins to support a welding head in a tiltable or locked position, the hinge pins having axial support resulting in a free and easy movement of the welding head for tilting purposes.

These and other objects and advantages of the invention will be set forth in the following description made in connection with the accompanying drawings in which like reference characters refer to similar parts throughout the several views.

DESCRIPTION OF THE DRAWINGS

FIG. 2 is a front elevational view;

FIG. 3 is a broken view in perspective;

FIG. 4 is a partial vertical view taken on line 4—4 of FIG. 1 as shown;

FIG. 5 is a view in vertical section taken on line 5—5 of FIG. 4; and

FIG. 6 is a fragmentary view in vertical section showing a detail of structure of FIG. 4 in an alternate position.

DESCRIPTION OF A PREFERRED EMBODIMENT

Figure 1:
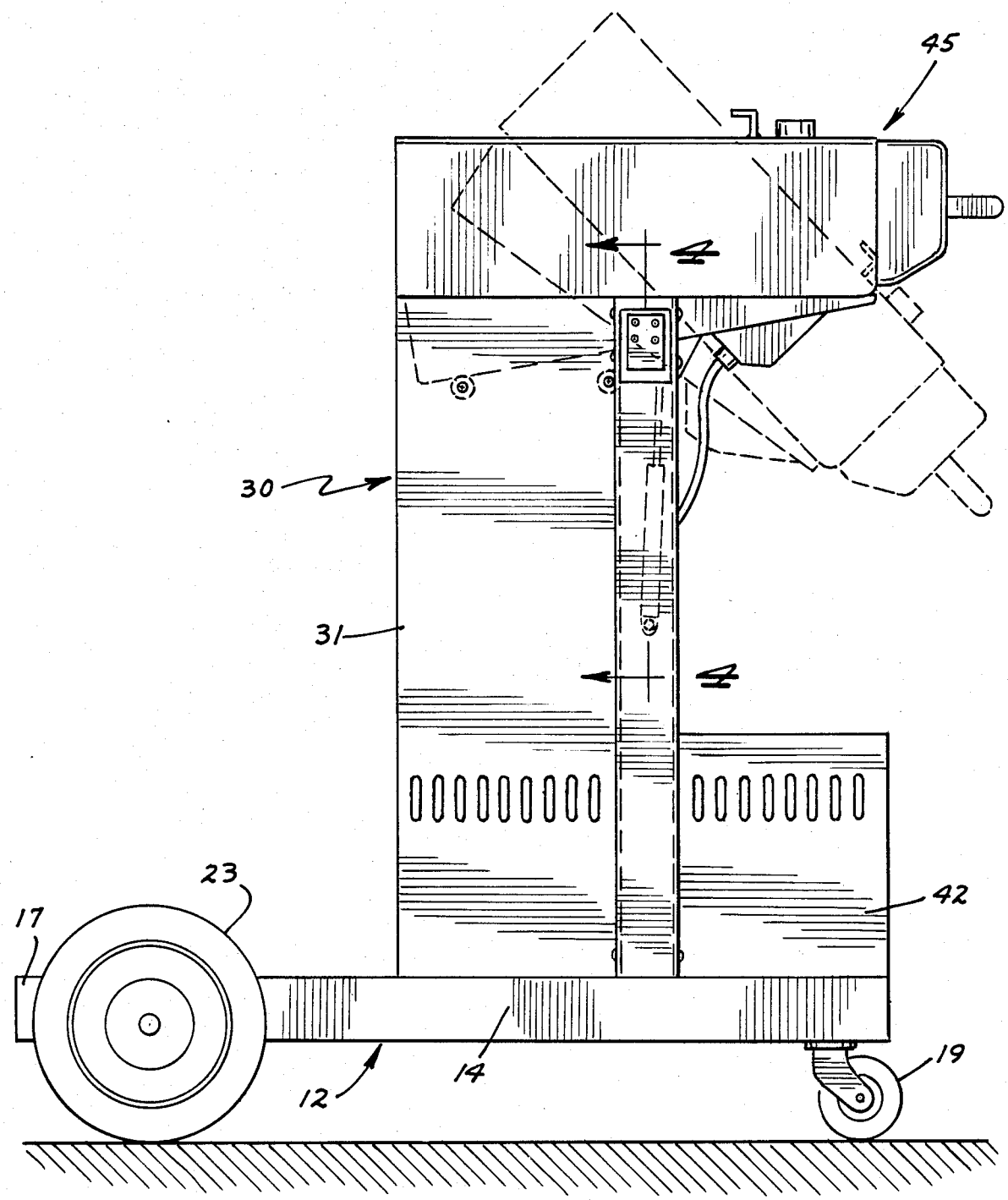
FIG. 1 is a view in side elevation showing a portion thereof in dotted line in alternate position.

Referring to the drawings, the welding machine herein is indicated generally by the reference numeral 10.

As here shown, said machine comprises a chassis 12 comprising side frame members 14 and 15, and a corresponding rear cross member 17. A front cross member is supported by swivel casters 19. Mounted onto a shaft 20 extending crosswise of the rear end portions of the side members 14 and 15 are wheels 23.

Upstanding from said chassis, being supported thereon in a conventional manner, is the welding housing structure 30 consisting of a rear wall 31, side walls 33 and 34 and an open front wall 36. Mounted between said side walls extending the depth thereof is a shelf member 40.

Extending forwardly of the lower portions of said side walls are forwardly projected side walls 42 and 43 having a front end wall 44.

Supported by said housing structure 12 is a welding head 45 to be further described hereinafter.

Supporting said welding head is a substantially U-shaped frame-like tiltable support member 47 having a rear wall 49, right angled forwardly extending side walls 51 and 52 which are tapered forwardly as indicated at 51a and 52a and said walls extend substantially to point in vertical alignment with the forward ends of said side walls 42 and 43.

A right angled flange 54 extends inwardly of said rear wall 49 and right angled flanges 55 and 56 extend inwardly of said side walls 51 and 52 forming bottom walls.

Carried by said side walls 33 and 34 are a pair of bolt secured horizontally aligned stop members 60 which support said member 47 in a horizontal position.

Described now will be the latch structure which tiltably supports the member 47 and releasingly secures said welding head 45.

The support frame member 47 has depending from the forward portions of its flanges 55 and 56 triangular pivot plate members 57 and 58 as best shown in FIGS. 2, 3, 4 and 6. Said plate members have right angled upper portions 59 and 60 respectively secured to the undersides of said flanges 55 and 56 by bolts 62.

Operatively associated with said members 57 and 58 are arcuate slots 63 and 64 to be further described. Adjacent the inner ends of said slots as indicated at 66 are stop members.

Upstanding along the forward edges of said side walls 33 and 34 and suitably secured thereto are channel members 70 and 71.

Said channel member 70 and the structure therein will be described and will be representative of what may not be shown of the channel member 71, a mirror image thereof.

Said channel member 70 has an outer end wall 73, side walls 75 and 77 and a top wall 78.

Disposed within said channel members 70 and 71 are inner channel members 79 and 80 each of a lesser depth having end walls 81 and 82 forming webs within said members 70 and 71. Said channel member 70 has side walls 83 and 85 secured to the side walls 75 and 77 as by bolts 87 as indicated in FIG. 3 and will be secured the same at the bottoms thereof though not here shown. The structure described of the channel member 79 is representative of the channel member 80 which will not be further described.

Referring to FIG. 5, a piston member 90 is shown comprising a barrel 92 secured at its lower end by a bolt 94 to the adjacent side wall 33 and having an operating rod 96 secured at its upper end 96a by a bolt 98 to the lower tip portion 57a of the triangular pivot plate 57 and it is secured thereto through the slot 63 as shown in FIGS. 4 and 6. The bolt 98 is shown having lock nuts 98a thereon which is a conventional fastening arrangement.

Said piston member may be variously formed and powered and is here indicated as having a gas pressurized barrel.

To be described is a quick release latch structure 100 and mounted in the channel member 70 and a counterpart thereof, not shown, is mounted in the channel member 71. The latch structure 100 will be described and its counterpart latch structure is a mirror image thereof.

Referring particularly to FIGS. 3 and 4–6, a locking pin 103 is shown having an outer end bar portion 103a disposed and slidable through an opening 81a in the wall 81 and extending between a pair of spaced link block members of which only one indicated at 104 is shown, the end portion of said pin 103 being secured thereto by a pin 105. Secured thereto by rivets 106 and overlying said block members is a rectangular operating plate member 107.

Said pin 103 has a shoulder 108 here shown in the form of a washer and disposed on said pin between said shoulder and said wall 81 is a compression coil spring 110. The forward end 103b of said pin 103 extends through an opening 33a in said side wall 33 and an aligned opening 51b extending through the side wall 51 of the support member 47. A corresponding opening 45a is present in the adjacent side wall portion of the welding head 45.

The following described structure supports the locking pin 103.

A cylindrical bearing 112 is provided having an annular shoulder 113. The bore 114 of said bearing is of a diameter to receive the shoulder 108 of said locking pin 103. Said bearing is disposed through an opening 117 of what is shown here as a rectangular block 116 with the shoulder 113 engaging one side of said block and a washer 118 facing the other side of said block, said washer and shoulder being secured through said block by bolts 20 disposed through appropriately provided holes.

Said block is mounted upon and secured to the wall 81 by bolts 122 and nuts 123. Said nuts will be positioned onto the bolts 122 to space the block 116 from said wall 81 in accordance with the length of travel of the shoulder 108, the spacing being such as to retain said shoulder within said bore 114 at all times for radial support thereof.

The openings through which the pin moves, namely, 81a, 33a, 51a and 45a, are of a diameter to just accommodate said pin serving as a bearing surface. The shoulder 108 as described is supported in the bore or bearing 114. Thus, there is axial support along said pin as the free end portion thereof has a substantial radial load thereon in retaining said welding head 45, particularly when said welding head is in a tilted position.

The welding head 45 herein represents a conventional structure. The invention herein relates to the tilting support for said welding head and the structure permitting a quick detachment of said welding head from the housing 30.

Said piston member 90 and its counterpart are secured to the lower tip portions of the triangular plate members 57 and 58. With the welding head in horizontal position upon said support frame 47, to tilt said welding head, the forward portion thereof is pressed downwardly as the rear portion thereof is raised upwardly and this is sufficient effort to move the bolts 98 through their respective arcuate slots. The tilt of the welding head is limited by the stop members 66.

The piston 96 holds the bolt 98 and the pivot plate 57 under tension at each end of the slot 63 to securely position the welding head to be in a horizontal or tilted position as the case may be. The pressure to pivot the welding head is merely that which is sufficient to extend the arcuate slots 63 and 64 and move the respective pivot plates 57 and 58 accordingly.

It should be noted that the locking pin 103 and its counterpart 102 secure said welding head against any movement relative to the frame 47.

In supporting the load placed upon the locking pin 103 and its counterpart 102, support as described is axially spaced to prevent any displacement resulting from a bending stress.

To move the welding head 45 closer to a job site or position than is possible in mounted position, the operating plate member and its counterpart are merely pulled outwardly withdrawing the locking pin 103 and its counterpart 102 against the tension of their respective springs to have the pins clear of the side walls of said welding head. The plate members in being pulled outwardly are held in locked position by being pulled outwardly into dead center positions as indicated in FIG. 6.

The welding head is then lifted out of the frame 47 and positioned where desired to the extent permitted by the umbilical cord 125 which connects the welding head circuitry to the power source carried by said housing structure 30.

Thus there is provided a very simply operated latching structure for securing or permitting the removal of the welding head 45.

It will of course be understood that various changes may be made in the form, details, arrangement and proportions of the parts without departing from the scope of the invention herein which, generally stated, consists in a device capable of carrying out the objects above set forth, in the parts and combination of parts disclosed.

What is claimed is:

1. In a welding machine including a housing and a demountable welding head disposed thereon, a tilting releasing latch structure, having in combination
   a welding machine housing,
   a demountable welding head disposed upon said housing,
   a supporting member for said welding head carried by said housing,
   said supporting member comprising a back wall and a pair of side walls, said walls having inwardly angled flanges having said welding head disposed thereon,
   a pair of opposite plate members depending from said flanges of said side walls,
   side walls portions of said housing adjacent said plate members each having an arcuate slot therein,
   a piston member carried by said housing on each of said side wall portions adjacent said slots, and at the other side of said walls from that of said plate members,
   means respectively connecting the extendible portions of said piston members to said plate members through said arcuate slots,
   whereby movement of said means through said slots in one direction tilts said welding head.

2. A releasable locking and tilting latch structure in connection with a welding machine, having in combination a welding machine housing,
a welding head disposed upon said housing,
a support member for said welding head carried by said housing,
means pivotally supporting said support member,
yielding locking means carried by said housing engaging said welding head,
said yielding locking means operatively engaging said pivot supporting means,
means in connection with said yielding means arranged and constructed to cause said yielding means to hold said support member and the welding head thereon in a tilted position and in a horizontal position in the alternative,
said support member comprises a frame member having a back well and side walls,
said walls having flange portions adapted to underlie and support said welding head,
said pivotal means comprising oppositely disposed plate members depending from said flanged portions of said side walls of said support member,
said yielding means comprising the extensible operating rod of a pressurized piston, and
said means in connection with said yielding means comprising an arcuate slot and a member riding in said slot connecting said yielding means and said pivotal means.

3. The structure of claim 2, wherein said yielding locking means comprises a spring loaded pin,
a plate member is mounted on a side of said housing adjacent said pivot support means,
a block member,
means securing said block member in spaced relation to one side of said plate member,
a bearing disposed through said block member,
said pin having a collar thereon journaled in said bearing,
the spring on said pin bearing against said one side of said plate member and said collar,
said pin having an end portion extending through said plate member,
a link block member at the other side of said plate member,
means pivoting said extended end portion of said pin to said link block member such that said link block member upon being pivotally extended to a position at right angles to said plate member that said spring is contracted and the end portion of said pin normally engaging said welding head is withdrawn into said bearing,
a plate member overlies said link block, and
means securing said plate member to said link block.

* * * * *